United States Patent [19]

Schultz et al.

[11] Patent Number: 5,053,740
[45] Date of Patent: Oct. 1, 1991

[54] PORCELAIN ENAMEL TEMPERATURE SENSOR FOR HEATING OVENS

[75] Inventors: John Schultz; Thomas R. Payne, both of Louisville, Ky.

[73] Assignee: General Electric Company, Louisville, Ky.

[21] Appl. No.: 463,596

[22] Filed: Jan. 11, 1990

[51] Int. Cl.$^5$ .............................................. H01C 3/04
[52] U.S. Cl. .................................. 338/25; 338/22 R; 374/185
[58] Field of Search ................... 338/25, 22 R, 35; 374/29, 30, 185

[56]  References Cited

U.S. PATENT DOCUMENTS

| | | | |
|---|---|---|---|
| 3,006,775 | 10/1961 | Chen | 106/39 |
| 3,720,900 | 3/1973 | Von Bruning | 338/25 |
| 3,786,390 | 1/1974 | Kristen | 338/22 R |
| 3,872,419 | 3/1975 | Groves et al. | 338/25 |
| 4,050,052 | 9/1977 | Reichelt et al. | 338/308 |
| 4,103,275 | 7/1978 | Diehl et al. | 338/25 |
| 4,139,833 | 2/1979 | Kirsch | 338/308 |
| 4,237,368 | 12/1980 | Welch | 219/449 |
| 4,282,507 | 8/1981 | Tindall et al. | 338/25 |
| 4,375,056 | 2/1983 | Baxter et al. | 338/25 |
| 4,719,442 | 1/1988 | Bohara et al. | 338/25 |
| 4,722,609 | 2/1988 | Epstein et al. | 338/25 X |
| 4,791,398 | 12/1988 | Sittler et al. | 338/25 |
| 4,816,647 | 3/1989 | Payne | 219/464 |

Primary Examiner—Marvin M. Lateef
Attorney, Agent, or Firm—H. Neil Houser; Radford M. Reams

[57]  ABSTRACT

A temperature sensor is formed with a metal substrate at least a portion of which is coated with a layer of porcelain enamel. At least one conductive element is deposited on the coated portion of the substrate in such a manner as to provide a first sensor configuration for sensing temperature as a function of the resistance of the conductive element itself. This conductive element in operative combination with the porcelain enamel layer and the metal substrate provides a second sensor configuration for sensing temperature over a second temperature range as a function of the resistance of the porcelain enamel layer.

15 Claims, 4 Drawing Sheets

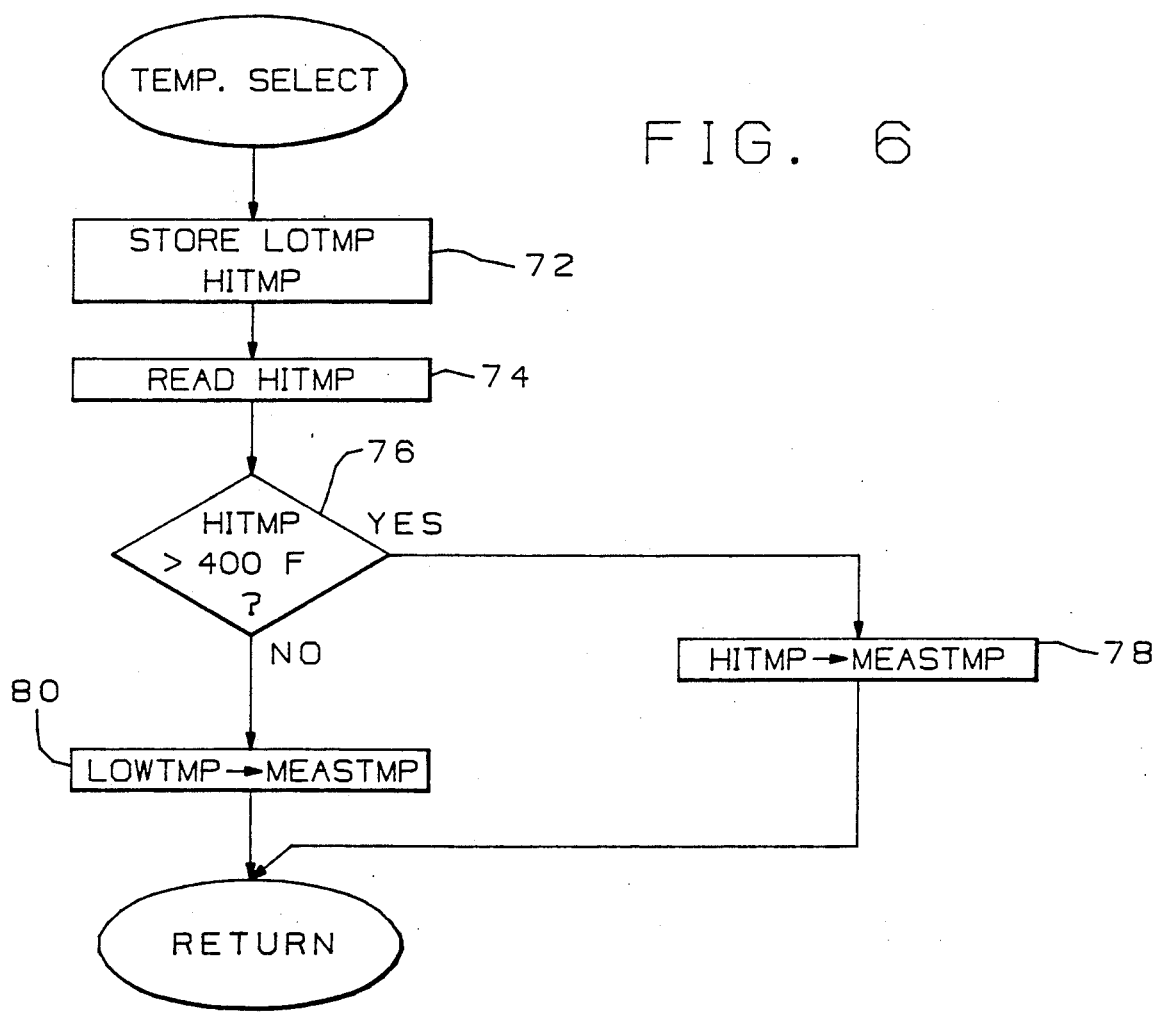

PORCELAIN ENAMEL TEMPERATURE SENSOR FOR HEATING OVENS

BACKGROUND OF THE INVENTION

This invention relates generally to temperature sensors for heating ovens.

Temperature sensors conventionally employed in electronically controlled ovens such as sheathed nickel wire sensors or platinum resistance temperature detectors are characterized by a relatively low thermal coefficient of resistivity, which limits the accuracy of such devices. Commonly assigned, co-pending patent application Ser. No. 462,110, filed Jan. 8, 1990, discloses an improved multi-element sensor employing a glass-ceramic substrate characterized by a higher coefficient of resistivity. The resistance of the glass-ceramic substrate is used to measure temperature over the middle and upper portion of the operating range. However, the resistance of the substrate becomes too large for use for temperatures in the lower portion of the operating range. The resistance of a serpentine length of conductive material deposited on the substrate is used to measure temperature over the low end of the oven operating range. This multi-element sensor provides a significant performance advantage over prior art sensors particularly in the mid to upper portion of the temperature range. In addition sensors of this type are operable over an extended temperature range up to 1500 F. One disadvantage is that the thermal inertia of the glass-ceramic material renders the sensor slow to respond to changes in temperature.

It is therefore an object of the present invention to provide an improved temperature sensor for a cooking oven which retains the accuracy advantages of the aforementioned glass-ceramic sensor while being lower in cost and having a greater speed of response to changes in temperature.

SUMMARY OF THE INVENTION

In accordance with one aspect of the present invention a temperature sensor essentially comprises a metal substrate at least a portion of which is coated with a layer of porcelain enamel. At least one conductive element is deposited on the coated portion of the substrate in such a manner as to provide a first sensing means for sensing temperature as a function of the resistance of the conductive element itself. This conductive element in operative combination with the porcelain enamel layer provides a second sensing means for sensing temperature over a second temperature range as a function of the resistance of the porcelain enamel layer.

The resistance of the porcelain enamel layer to be suitable for measuring temperature should be in the range of 100 to $10^5$ ohms over the second temperature range of interest, which in a preferred form of the invention is on the order of 400°–1000° F. Similarly the resistance of the conductive element comprising the first sensor should be in the same resistance range over the relatively low temperature range on the order of 100°–500° F.

While the novel features of the invention are set forth with particularity in the appended claims, the invention both as to organization and content will be better understood and appreciated from the following detailed description taken in conjunction with the drawings.

BRIEF DESCRIPTION OF THE DRAWINGS

FIG. 6 is a flow diagram of the Temp Select Routine incorporated in the control program for the microprocessor in the circuit of FIG. 5.

DETAILED DESCRIPTION

Figure 1:
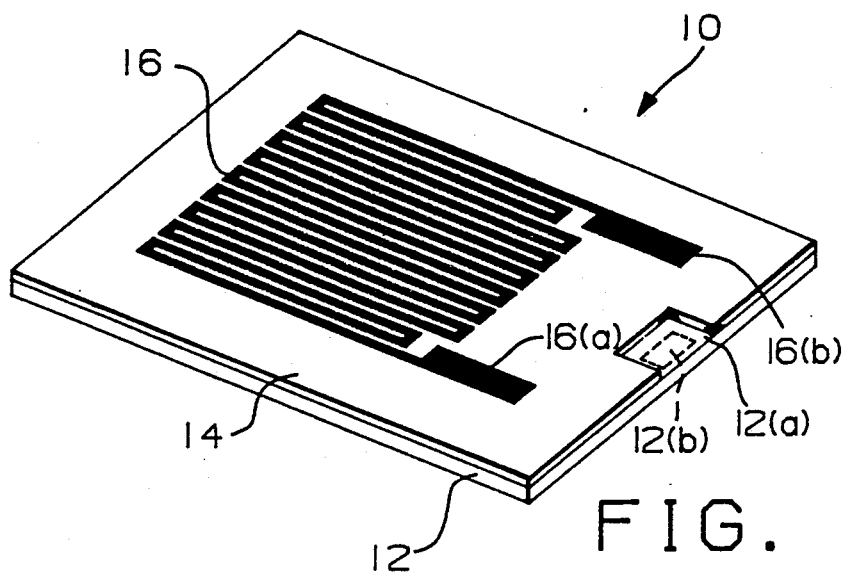
FIG. 1 is a perspective view of a temperature sensor illustratively embodying the present invention.
Figure 2:
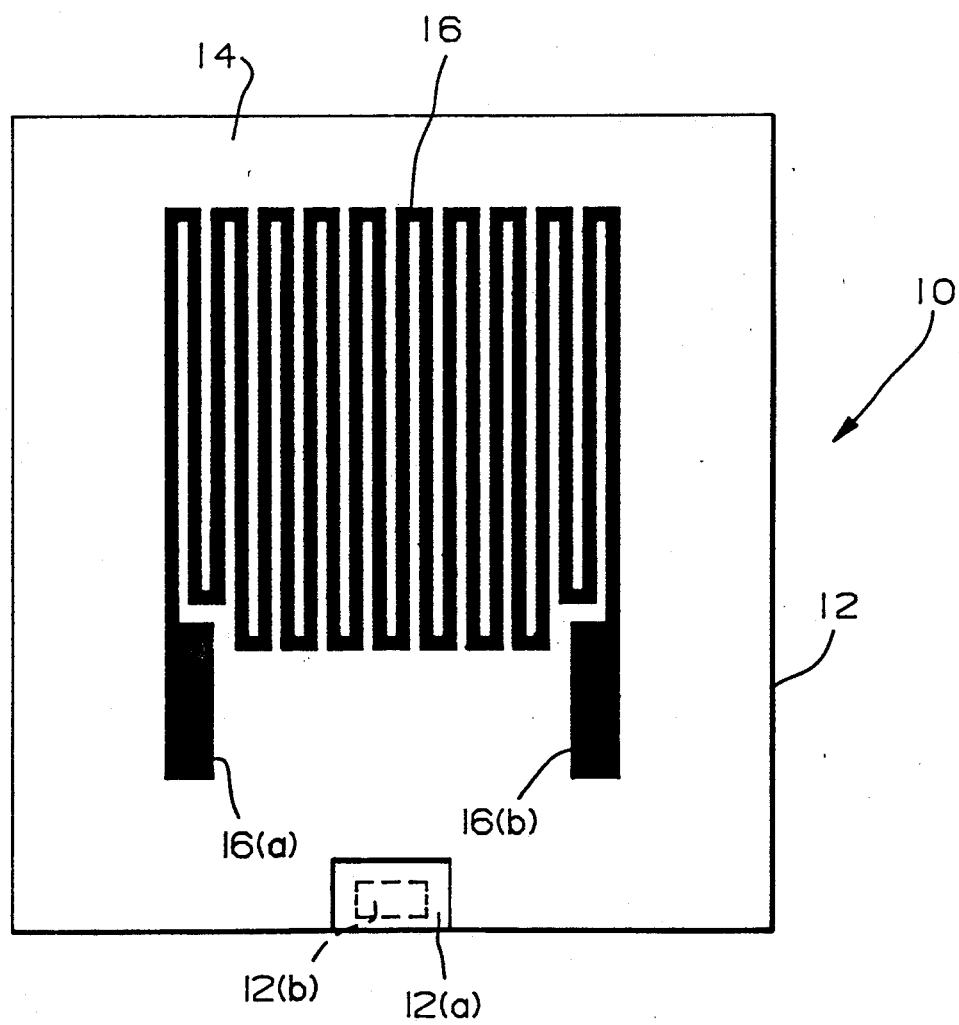
FIG. 2 is an elevational top view of the sensor of FIG. 1.

Referring now to FIGS. 1 and 2, a temperature sensor illustratively embodying the present invention designated generally 10, comprises a planar metal panel or substrate 12. At least a portion of the upper surface is coated with a layer of porcelain enamel 14. In the illustrative embodiment of FIG. 1 the entire metal panel is coated with a thin layer of porcelain enamel with the exception of a small unenamelled rectangular area 12(a) where the surface of metal panel 12 is exposed. This area of exposed panel surface provides a contact pad for electrical connector to external control circuitry. Specifically, the mechanical contact would be made within the area designated 12(b) and represented in FIGS. 1 and 2 as a phantom rectangle.

Enamel layer 14 is characterized by a negative temperature coefficient of resistivity. As will be hereinafter described in greater detail, the resistance of the enamel layer is used to measure temperature. The resistance of the enamel layer, having a relatively high coefficient of resistivity compared to that of conventional nickel or platinum wire sensors of the prior art, provides greater sensitivity for more accurate temperature measurements compared to conventional sensors.

The porcelain enamel comprising layer 14 in the illustrative embodiment comprises a recrystallized lithium aluminum silicate glass of the type described in commonly assigned U.S. Pat. No. 3,006,775, the descriptive portion of which is hereby incorporated by reference. The enamel is made by grinding the glass to a granular powder by ball milling. The glass is further ball-milled with water and the following ingredients to form a suspension suitable for spraying: glass 100 parts; Ferro #5 Clay 4 parts; bentonite ¼ part; sodium aluminate ¼ part; potassium carbonate ¼ part; and water 50 parts.

Metal panel 12 is formed of 430 stainless steel. Panel 12 is suitably prepared to receive the enamel layer such as by grit-blasting to roughen the surface for better adhesion. After spraying the enamel onto panel 12 and allowing it to dry, the enamel panel is fired at 1650° F. for five minutes to fuse the glass, and subsequently refired at 1525° F. for five minutes to enhance recrystallization. The thickness of the enamel layer 14 is preferably in the range of 5–15 mils.

Stainless steel is the preferred material for panel 12 because it provides a relatively good match to the coefficient of thermal expansion of the enamel layer for the particular enamel employed in the illustrative embodiment, and it does not oxidize significantly at the relatively high firing temperature used to apply the enamel layer. It will be appreciated that other enamels could be similarly employed which might have thermal expansion characteristics more compatible with carbon steel or enameling iron. Panels formed of carbon steel or enameling iron could be used with such enamels and would typically be prepared for the enamel layer by pickling.

The sensor of FIG. 1 is particularly applicable to domestic cooking ovens. The typical operating range for sensors employed in such ovens is on the order of 100–1000° F. For enamels known to the inventors having a resistance on the order of at least 100 ohms at the high end of this range, the resistance begins to exceed $10^5$ ohms as the temperature drops below the 400°–500° F. range. For resistance values greater than $10^5$ ohms the resistance becomes difficult to measure with conventional relatively inexpensive techniques. To retain the benefit of the increased sensitivity in the upper temperature range achievable by using the resistance of the porcelain enamel, in accordance with the present invention two sensor configurations are employed, one for the upper portion of the sensor operating range utilizing the resistance of a layer of porcelain enamel and one for the lower portion of the operating range which utilizes the resistance of a serpentine conductive element deposited on the surface of the enamel layer.

The sensor configuration for measuring temperature in the low portion of the temperature range comprises a metallic conductive element or electrode 16 applied to outer surface of porcelain enamel layer 14 by suitable means. In the illustrative embodiment element 16 is applied by screen printing a metallo-organic paste through a 200 mesh screen. The paste is a platinum resinate containing between 5 and 15% platinum, such as the platinum paste designated A4649 available form Engelhard Corporation. The paste is dried then fired at a temperature below the softening temperature of the enamel, which is approximately 1200° F. The organic portion of the paste is burned off leaving a metallic platinum conductive element which is tightly adhered to the porcelain enamel layer.

Figure 3:
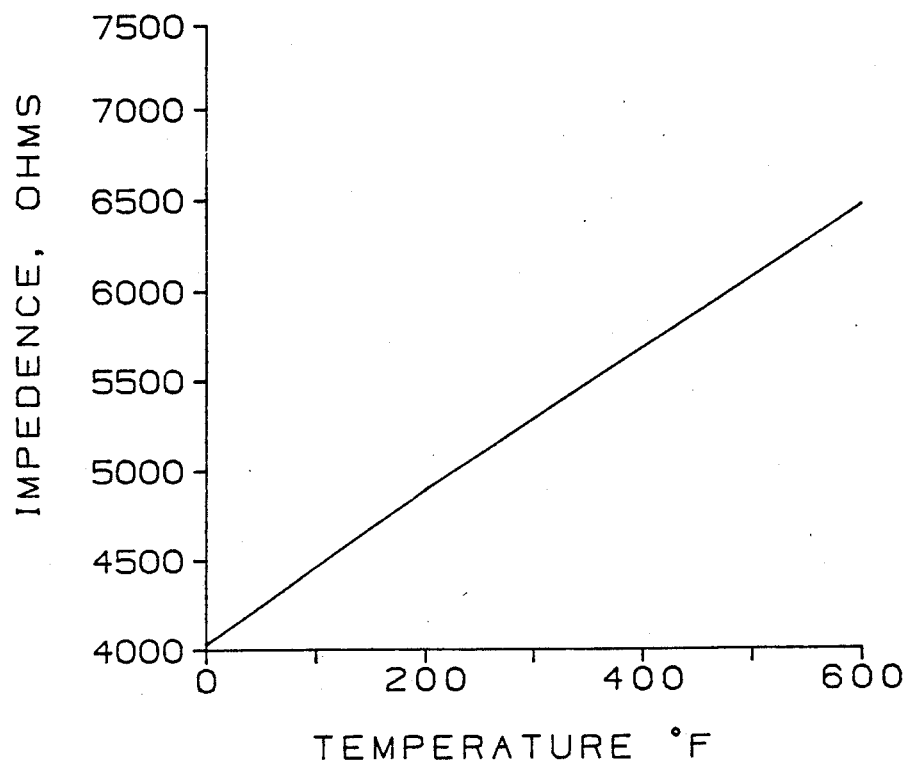
FIG. 3 is a graphical representation of the resistance versus temperature characteristic for the low temperature sensor configuration for the sensor of FIG. 1.

Element 16 is deposited over enamel layer 14 in a serpentine pattern to provide sufficient strip length in a relatively confined surface area. Element 16 is preferable approximately 0.05 inches wide and 35 inches long, with a lateral spacing between legs of about 0.05 inches. Contact pads 16(a) and 16(b) are provided at opposite ends of element 16 for connection to external control circuitry. The resistance of element 16 between pads 16(a) and 16(b) is measured to obtain temperature information. The enamel coated steel panel 12 merely provides structural support for the sensor element. As shown by the resistance versus temperature characteristic for conductive element 16 illustrated in FIG. 3, the resistance of the serpentine pattern of element 16 between pads 16(a) and 16(b) varies essentially linearly from 4500 ohms at 100° F. to 6500 ohms at 600° F.

As hereinbefore briefly described, a second sensor configuration measures temperature as a function of the resistance of the porcelain enamel layer 14. This second sensor configuration employs conductive element 16 and exposed contact area 12(b), which as hereinbefore described was left unenameled to permit electrical connection of metal panel 12 to external control circuitry. The resistance of the enamel layer in this configuration is measured between contact pad 16(b) and contact area 12(b). When connected to external control circuitry as hereinafter described with reference to FIG. 5, current flows from element 16 through enamel layer 14 to metal panel 12.

Figure 4:
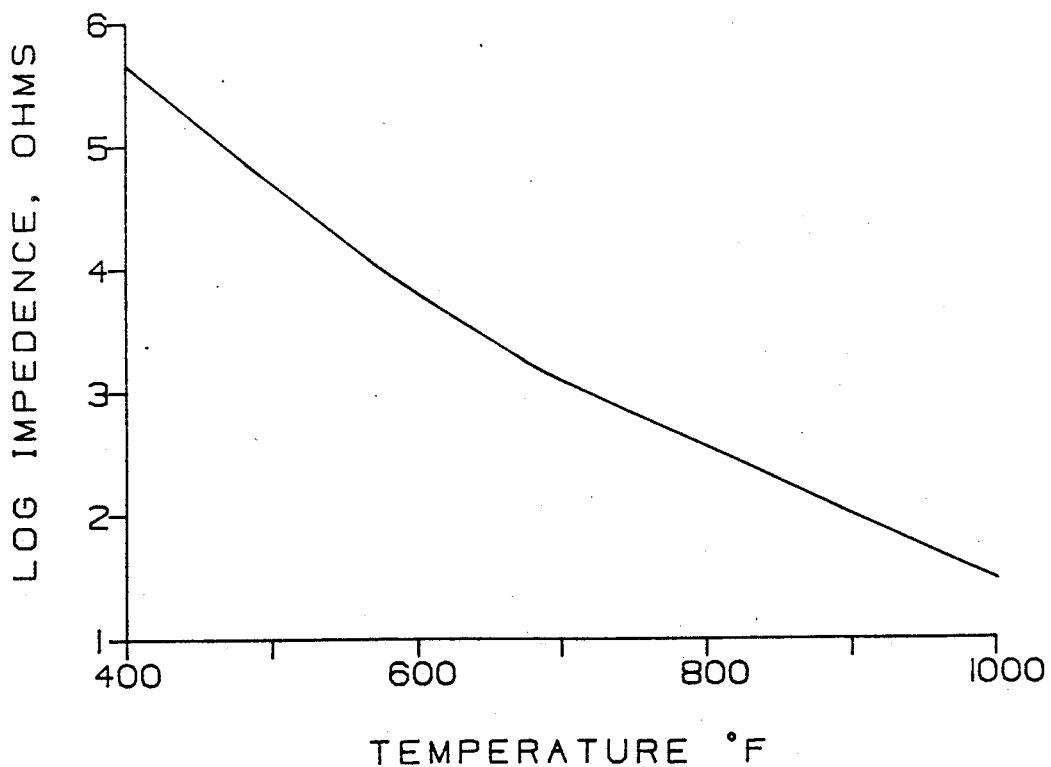
FIG. 4 is a graphical representation of the resistance versus temperature characteristic for the high temperature sensor configuration for the sensor of FIG. 1.

As illustrated by the temperature versus resistance characteristic shown in FIG. 4, the resistance of enamel layer 14 is in the $10^2$ to $10^5$ ohm range over the temperature range of interest which in this instance for the high temperature configuration is 400° to 1000° F. The particular porcelain enamel employed in the embodiment in FIG. 1 i intended to be illustrative and not limiting. Other porcelain enamels could be similarly employed. Such porcelain enamels would preferably be characterized by a temperature coefficient of resistivity which provides resistance values in the range of 100 to $10^5$ ohms over the temperature range of interest. At present, such sensors are as a practical matter limited to an upper temperature limit on the order of 1200° F. due to the tendency of most suitable enamels presently available to begin to soften as the temperature exceeds 1200° F.

In the illustrative embodiment of FIG. 1, an exposed contact area 12(a) is provided on the upper surface of the sensor for connection to external control circuitry. It will be appreciated that an alternative configuration could be similarly employed which is identical to the embodiment of FIG. 1 except that the entire upper surface of panel 12 is coated with a porcelain enamel layer. Operation of the serpentine element 16 would be the same as that of the FIG. 1 embodiment. In lieu of contact area 12(a), the electrical connection to measure the resistance of the enamel layer for the second sensor configuration would be made directly to the exposed metal bottom surface of panel 12.

As another alternative configuration, a second conductive element comprising a single strip comparable to one leg of the serpentine pattern made of the same paste and of comparable width and thickness to element 16, could be similarly deposited on enamel layer 14 laterally spaced from element 16. A contact pad would be formed at one end of the additional element for connection to external circuitry. The resistance of the enamel layer in this arrangement would be measured between contact pad 16(a) and the contact pad of the second element. When connected to external control circuitry as hereinafter described, current flows from the second element through the enamel layer 14 to the metal panel 12 then back to element 16, with a portion of the current also possibly flowing across the surface of enamel layer 14 between element 16 and the additional element. Since in this configuration current effectively flows through two thicknesses of the enamel layer, and the total surface area of the second element would be significantly less than that of element 16, this configuration would likely result in higher resistance values for the same enamel layer than that for the configuration of FIG. 1.

Figure 5:
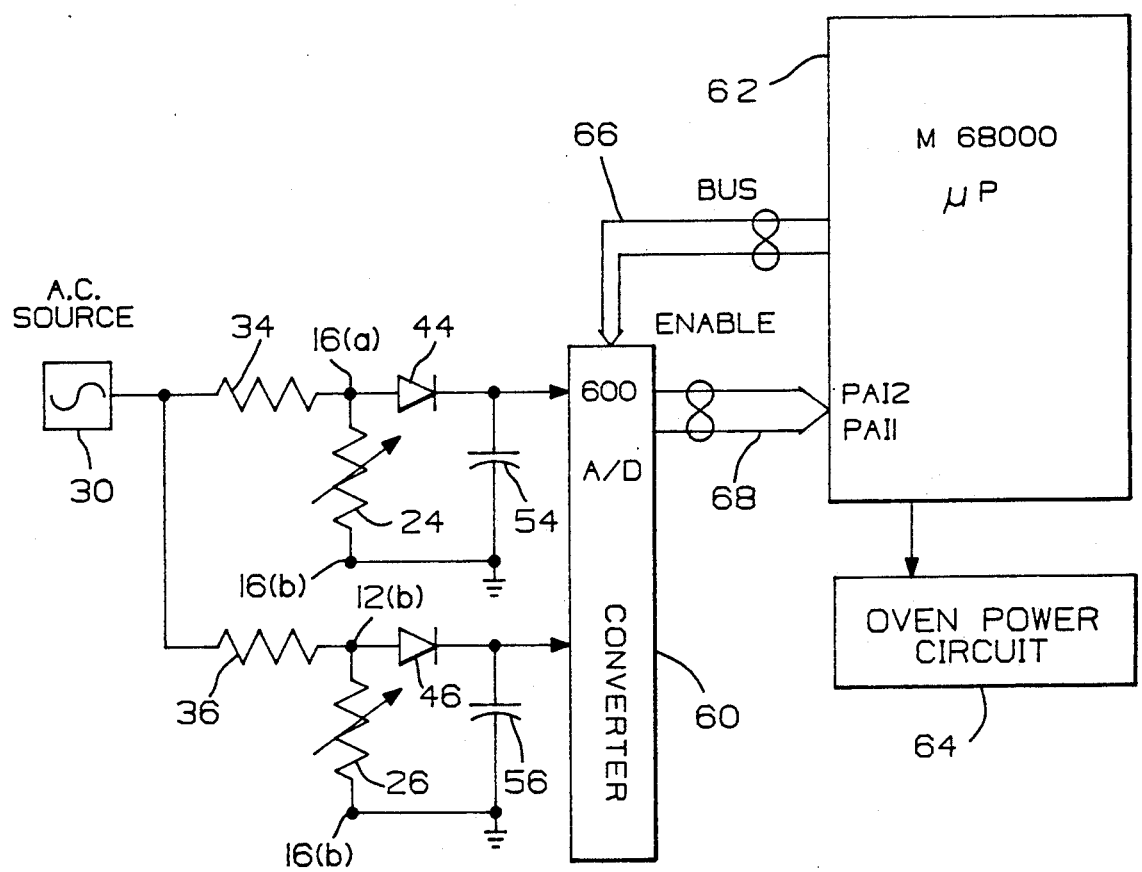
FIG. 5 is a simplified schematic circuit diagram for an oven control circuit incorporating the sensor of FIG. 1.

Illustrative external control circuitry for controlling the temperature in a domestic cooking oven incorporating sensor 10 of FIG. 1 is schematically illustrated in FIG. 5. Each of the two sensor configurations is represented in the circuit of FIG. 5, as a variable resistor. Resistor 24 represents the low temperature configuration comprising the resistance of strip 16 between pads 16(a) and 16(b). Resistor 26 represents the high temperature configuration comprising the resistance of enamel layer 14 between strip 16 and metal panel 12, as measured between pads 16(b) and 12(b).

An AC drive is necessary for the sensor configuration which uses the resistance of the porcelain enamel layer to prevent polarization of the enamel which would eventually occur if a dc source were to be applied. The drive circuit for each of the sensor configurations comprises a 5 volt, 60 Hz, AC supply 30 which is coupled to resistances 24 and 26 via current limiting resistors 34 and 36 respectively, at terminal pads 16(a) and 12(b) respectively. Diodes 44 and 46 and 10 μf capacitors 54 and 56 respectively rectify and smooth the AC signal appearing at terminal pads 16(a) and 12(b) for input to A/D converter 60. Converter 60 is a Motorola 600 A/D converter circuit.

Converter circuit 60 converts the analog voltage signals to digital signals for input to microprocessor 62, which generates power control signals for oven power circuit 64 as a function of the sensed temperature. Microprocessor 62 is a Motorola 68000 series microprocessor programmed to operate as a virtual memory machine, with its read only memory (ROM) permanently configured to implement a power control scheme for a range oven which uses temperature information from sensor 10, to control oven temperature.

Microprocessor 62 sequentially enables the input from each sensor configuration by enable signals coupled to converter 60 via bus 66. The converted output for the enabled sensor is then coupled by bus 68 to microprocessor 62 for storage at the corresponding one of the two memory locations PAI0 and PAI1 for resistances 24 and 26 respectively. By this arrangement the temperature sensed by each configuration is periodically stored in the microprocessor memory.

As briefly hereinbefore described, microprocessor 62 is customized by permanently configuring the ROM to implement a predetermined set of instructions to control oven temperature as a function of temperature information from sensor 10. FIG. 6 illustrates a flow diagram for the Temp Select control routine which enables the microprocessor to read in and store the sensor input signals and select the particular one of the two stored values to be used for the next power control decision. From this diagram one of ordinary skill in the programming art could prepare a set of instructions for permanent storage in the ROM of microprocessor 62 which would enable the microprocessor to implement this routine. It will be appreciated that other sub-routines would be included to perform the actual power control functions for the oven as well as other control functions for the appliance.

The function of the Temp Select routine is to select the temperature input obtained from the appropriate one of the two sensor configurations according to the temperature then being sensed. This is accomplished by first looking at the input from the high temperature configuration. If this input represents a temperature greater than 400° F., it is used as the power control value. If not, the input from the low range configuration is used as the control value.

Referring now to FIG. 6, on entering this routine the program stores the signals sequentially received via bus 68 at memory locations PAI0 and PAI1. The information stored at these locations is identified respectively as variables HITMP and LOTMP (Block 72). The signal stored at PAI0 corresponding to the output from the high temperature sensor configuration designated HITMP is read first (Block 74). If the sensed temperature is greater than 400° F. (Yes at Inquiry 76) this value is stored as the variable MEASTMP (Block 78), the variable used to represent the sensed oven temperature in the power control routine (not shown). If the output from the high temperature sensor configuration is less than 400° F., the output stored at PAI1 representing the output from the low temperature sensing configuration represented by the variable LOTMP is stored as the operative temperature variable MEASTMP (Block 80).

It is apparent from the foregoing that a sensor in accordance with the present invention comprising the combination of the serpentine element 16 as the sensor for the 100° to 400° F. portion of the operating temperature range, and the resistance of the enamel layer 14 as measured between element 16 and metal panel 12 as the sensor for the 400° to 1000° F. portion of the temperature operating range, provides a low cost, sensitive and quick responding sensor which is particularly well suited for application to electronically controlled heating ovens such as domestic cooking ovens.

While in accordance with the Patent Statutes specific embodiments of the present invention have been illustrated and described herein, it is realized that numerous modifications and changes will occur to those skilled in the art. For example, additional versatility for such sensors could be achieved by applying a second layer of an enamel having a different thermal coefficient of resistivity to the bottom surface of metal panel 12 in the embodiment of FIG. 1, and applying a conductive element similar to element 16 thereon. The resistance of this second layer could then be used to provide a third sensor configuration to measure temperature over a portion of the sensor operating range that may not be measured as effectively with just two configurations. It is therefore to be understood that the appended claims are intended to cover all such modifications and changes as fall within the true spirit and scope of the invention.

What is claimed is:

1. A temperature sensor comprising:
a metal substrate at least a portion of which is coated with a layer of porcelain enamel and at least one conductive element deposited on said coated portion of said substrate, said conductive element being arranged to provide a first sensing means for sensing temperature over a first temperature range as a function of the resistance of said element, said conductive element combination with said porcelain enamel layer being operative to provide a second sensing means for sensing temperature over a second temperature range as a function of the resistance of said porcelain enamel layer.

2. A temperature sensor in accordance with claim 1 wherein said enamel layer comprises a recrystallized lithium aluminum silicate glass composition.

3. A temperature sensor in accordance with claim 2 wherein the thickness of said porcelain enamel layer is on the order of 5 to 15 mils.

4. A temperature sensor in accordance with claim 1 wherein said metal panel is formed of stainless steel.

5. A temperature sensor in accordance with claim 1 wherein said first conductive element comprises a conductive film deposited on said enamel layer in a generally serpentine pattern and including a contact pad formed at each end thereof for connection to external circuitry and wherein said first sensing means is adapted to provide temperature information as a function of the resistance of said first element between said contact pads.

6. A temperature sensor in accordance with claim 5 wherein said second sensing means comprises the resistance of said enamel layer measured between said first conductive element and said metal substrate.

7. A temperature sensor in accordance with claim 6 wherein said first temperature range is a relatively low range, and said second temperature range is a relatively high range.

8. A temperature sensor in accordance with claim 7 wherein said enamel layer comprises a recrystallized lithium aluminum silicate glass composition.

9. A temperature sensor in accordance with claim 8 wherein the thickness of said porcelain enamel layer is on the order of 5 to 15 mils.

10. A temperature sensor in accordance with claim 9 wherein said metal panel is formed of stainless steel.

11. A temperature sensor comprising:
a metal panel;
a layer of porcelain enamel carrried on at least one surface of said metal panel, said porcelain enamel having a temperature coefficient of resistivity suitable for measuring temperature over a first relatively high temperature range;
a conductive element deposited on said porcelain layer, said element characterized by a temperature coefficient of resistivity suitable for sensing temperature over a second relatively lower temperature range;
said sensor being operative to provide temperature information as a function of the resistance of said enamel layer between said conductive element and said metal panel over said high temperature range and as a function of the resistance of said conductive element over said lower temperature range.

12. A temperature sensor in accordance with claim 11 wherein said relatively high temperature range is on the order of 400°–1000° F. and said low temperature range is on the order of 100° F–500° F.

13. A temperature sensor in accordance with claim 12 wherein said enamel layer comprises a recrystallized lithium aluminum silicate glass composition.

14. A temperature sensor in accordance with claim 13 wherein the thickness of said porcelain enamel layer is on the order of 5 to 15 mils.

15. A temperature sensor in accordance with claim 14 wherein said metal panel is formed of stainless steel.

* * * * *